United States Patent

Smithson

(10) Patent No.: US 9,246,987 B2
(45) Date of Patent: Jan. 26, 2016

(54) SERVICE REGISTRY FOR WEB SERVICES

(71) Applicant: International Business Machines Corporation, Armonk, NY (US)

(72) Inventor: Martin J. Smithson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 13/912,509

(22) Filed: Jun. 7, 2013

(65) Prior Publication Data

US 2013/0339480 A1 Dec. 19, 2013

(30) Foreign Application Priority Data

Jun. 13, 2012 (GB) .................................. 1210452

(51) Int. Cl.
*G06F 15/16* (2006.01)
*H04L 29/08* (2006.01)

(52) U.S. Cl.
CPC ................. *H04L 67/10* (2013.01); *H04L 67/02* (2013.01); *H04L 67/16* (2013.01)

(58) Field of Classification Search
CPC ......... H04L 67/02; H04L 67/10; H04L 67/16; H04L 67/25
USPC .................................. 709/203, 217, 223, 224
See application file for complete search history.

(56) References Cited

U.S. PATENT DOCUMENTS

| | | | |
|---|---|---|---|
| 7,392,298 B2 | 6/2008 | Berkland et al. | |
| 7,590,935 B2 | 9/2009 | Dumitru et al. | |
| 7,620,934 B2 * | 11/2009 | Falter | G06F 17/30893 709/223 |
| 7,698,398 B1 * | 4/2010 | Lai | G06F 8/10 709/223 |
| 7,792,921 B2 * | 9/2010 | Taylor et al. | 709/217 |
| 7,853,643 B1 * | 12/2010 | Martinez et al. | 709/203 |
| 8,069,435 B1 * | 11/2011 | Lai | G06Q 10/10 717/106 |
| 8,082,548 B2 | 12/2011 | Betzler et al. | |
| 9,058,571 B2 * | 6/2015 | Guizar | G06Q 10/06 1/1 |
| 2004/0054969 A1 | 3/2004 | Chiang et al. | |
| 2004/0117425 A1 * | 6/2004 | Berkland | H04L 29/06 709/200 |
| 2005/0044197 A1 * | 2/2005 | Lai | G06Q 10/10 709/223 |
| 2007/0011605 A1 * | 1/2007 | Dumitru et al. | 715/513 |
| 2007/0073771 A1 * | 3/2007 | Baikov | G06F 8/65 1/1 |
| 2007/0276898 A1 * | 11/2007 | Berkland et al. | 709/201 |

(Continued)

OTHER PUBLICATIONS

Anzbock, et al. "Semi-Automatic Generation of Web Services and BPEL Processes—A Model-Driven Approach", Proceedings of the 3rd International Conference on Business Process Management; Sep. 5-8, 2005; pp. 64-79.

(Continued)

*Primary Examiner* — Thu Ha Nguyen
(74) *Attorney, Agent, or Firm* — Cantor Colburn LLP

(57) ABSTRACT

Embodiments relate to operating a service registry for web services, the service registry comprising a plurality of different environments for the web services. An aspect includes detecting the creation of a first endpoint definition document for a specific web service, the first endpoint definition document defining address data for the specific web service in one environment. Another aspect includes accessing data defining the different environments associated with the service registry. Another aspect includes creating one or more additional endpoint definition documents for the specific web service from the first endpoint definition document and the accessed data. Yet another aspect includes storing the one or more additional endpoint definition documents using the service registry.

12 Claims, 6 Drawing Sheets

(56) References Cited

U.S. PATENT DOCUMENTS

| | | | | |
|---|---|---|---|---|
| 2008/0028316 | A1* | 1/2008 | Schoning et al. | 715/733 |
| 2009/0292797 | A1* | 11/2009 | Cromp et al. | 709/223 |
| 2011/0196940 | A1* | 8/2011 | Martinez | H04L 29/06 709/217 |
| 2012/0254240 | A1* | 10/2012 | Mariotti et al. | 707/770 |
| 2013/0086212 | A1* | 4/2013 | MacInnis | H04L 67/16 709/217 |
| 2013/0339480 | A1* | 12/2013 | Smithson | H04L 67/10 709/217 |
| 2015/0237149 | A1* | 8/2015 | MacInnis | H04L 67/16 709/217 |

OTHER PUBLICATIONS

Lu, et al., "Pollock: Automatic Generation of Virtual Web Services from Web Sites", Proceedings of the 20th Annual ACM Symposium on Applied Computing; Mar. 13-17, 2005; pp. 1650-1655.

* cited by examiner

SERVICE REGISTRY FOR WEB SERVICES

PRIORITY

This application claims priority to Great Britain Patent Application No. GB 1210452.7, filed 13 Jun. 2012, and all the benefits accruing therefrom under 35 U.S.C. §119, the contents of which in its entirety are herein incorporated by reference.

BACKGROUND

The present disclosure relates to decision definition for documents, and more specifically, to a service registry for web services.

Web services are described using Web Services Description Language (WSDL) documents where a WSDL document simply contains a set of definitions. These Web Service Definitions are often provided at three levels. Service interface definitions describe the interfaces in terms of operations and signatures provided by a service. These will often reference extensible markup language (XML) schemas to define common message formats or operation parameters. Service binding definitions describe how the interfaces are represented in the infrastructure and over the wire. This defines the transport protocols that are supported such as simple object access protocol (SOAP), Java module system (JMS) (Java and all Java-based trademarks and logos are trademarks or registered trademarks of Oracle and/or its affiliates), and others. This references the service Interface definition to indicate exactly which operations are supported over this transport protocol. Service endpoint definitions describe each individual deployed service and describe how a consumer finds and connects to a service. They define the endpoints and indicate which bindings and thus interfaces are supported on each endpoint.

Each of the three levels of service definition may be defined in separate WSDL documents, with each document importing other documents as needed. This approach results in cleaner service definitions and maximizes the ability to reuse service definitions. The implication of following this approach when using a registry/repository product, such as WebSphere (WebSphere is a registered trademark of International Business Machines Corporation) Service Registry and Repository (WSRR), is that it is required to load an endpoint WSDL document into the registry/repository for each environment to which a service is deployed, as the web service moves through the service development lifecycle. The only difference between these endpoint WSDL documents is usually the universal resource locator (URL) of the endpoint for the web service in question. While the generation of these documents might not be too onerous when considering a single service, the overhead of manually generating these endpoint WSDL documents can become an issue as the number of services grows or as the number of environments used (development, test, staging, production, etc.) grows.

SUMMARY

Embodiments include a method, system, and computer program product for operating a service registry for web services, the service registry comprising a plurality of different environments for the web services. An aspect includes detecting the creation of a first endpoint definition document for a specific web service, the first endpoint definition document defining address data for the specific web service in one environment. Another aspect includes accessing data defining the different environments associated with the service registry. Another aspect includes creating one or more additional endpoint definition documents for the specific web service from the first endpoint definition document and the accessed data. Yet another aspect includes storing the one or more additional endpoint definition documents using the service registry.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 is a further schematic diagram of the web service registry, with an additional plug-in;

DETAILED DESCRIPTION

Figure 1:
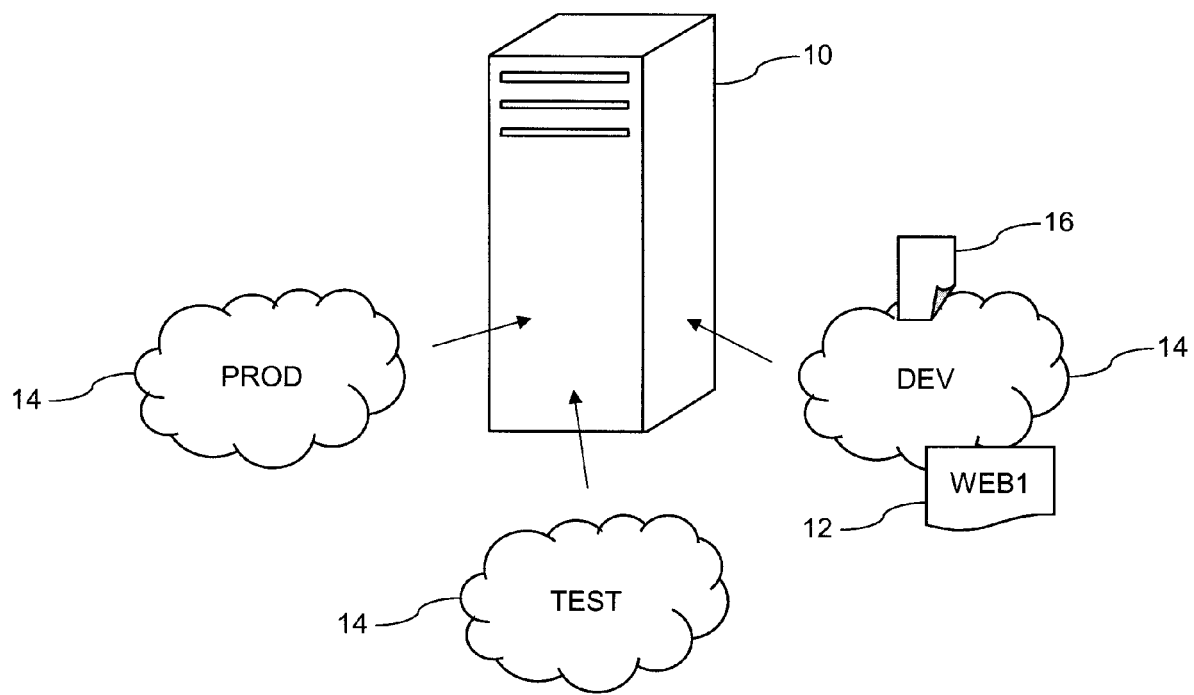
FIG. 1 is a schematic diagram of a web service registry.

Embodiments described herein are directed to a service registry for web services. Various embodiments provide a framework that can be implemented within a web service registry such as WSRR that can be used to automatically generate endpoint WSDL documents for environments that are defined within the WSRR, based on, for example, template information that is also defined within WSRR. The registry is configured so that it will detect a new endpoint definition document for a web service in one environment and automatically populate endpoint definition documents for the web service throughout the other environments within the registry. This reduces the workload that would otherwise have to be carried out by an administrator and also reduces the chances of errors occurring if the relevant documents were being created manually by the administrator.

In some embodiments, the creation of one or more additional endpoint definition documents for the specific web service is performed by copying the first endpoint definition document and adjusting the address data within the first endpoint definition document according to the accessed data. A simple way in which the propagation of the new endpoint definition documents can be achieved is to use the newly created endpoint definition document as the starting point for the additional endpoint definition documents that are being generated. This reduces the load on the registry in terms of the complexity of the process and ensures that all of the necessary information within the newly created endpoint definition document is present in the additional endpoint definition documents.

In some embodiments, the creation of one or more additional endpoint definition documents for the specific web service comprises creating an endpoint definition document for each environment that does not have an endpoint definition document for the specific web service. The web service registry can be configured so that new endpoint definition documents are created such that there will be one for each environment within the registry. This is the optimal solution, since it can be assumed that the web service will ultimately pass through all of the environments present, during its development cycle. By providing endpoint definition document in each of the available environments, all future locations for the web service are catered for.

In some embodiments, the creation of one or more additional endpoint definition documents for the specific web service comprises accessing a template for each environment and modifying the first endpoint definition document according to an accessed template. The use of templates will improve the process, as the templates can be reused in different environments and registries with limited changes and this will lead to a reduction in the amount of work needed to implement the process in any given web service registry.

In some embodiments, storing each additional endpoint definition document in the service registry comprises storing each additional endpoint definition document with an environment specific suffix. The process can be configured so that the naming of the relevant documents can follow a logical procedure when they are saved and this will ensure that the documents are recognisable as being relevant to the respective environment. This has advantages for the locating of the documents and for the handling of the documents in any error detection process.

FIG. 1 shows a service registry 10 for web services 12. The registry 10 comprises a plurality of different environments 14 for the web services 12. In the example of FIG. 1, the web service registry 10 has three different environments 14, labelled "DEV" (development "TEST" and "PROD" (production). The web service registry 10 can have as many or as few environments 14 as determined by the administrator of the registry 10. The web service 12, labelled "WEB1", is currently located in the development environment 14 and is currently at the start of its development lifecycle. As the web service 10 moves through its lifecycle it will move to different environments 14.

A document 16 is also shown as present in the development environment 14. This document 16 will be one of three documents 16 that define information relating to the web service 12, although these documents can be combined in a single document. For reasons of clarity, only one document 16 is shown for the web service 12. In a practical implementation of the web service registry 10, each environment 14 will have numerous different web services 12 present at any one time, and each of those web services 12 will have one or more documents 16 linked to it. Although the document 16 is shown as being present in the environment 14, it could be stored elsewhere.

The document 16 is an endpoint definition document 16 for the specific web service 12. This document 16 describes the service 12 and describes how someone who wishes to use the service 12 finds and connects to the web service 12. The document 16 defines the endpoints and indicates which bindings and thus interfaces are supported on each endpoint. Essentially, the document 16 defines address data for the specific web service 12 in the environment 14.

Users will access the endpoint definition document 16 for the specific web service 12 in order to discover how to the access the web service 12 while it is in its current location, which is the development environment 14.

Figure 2:
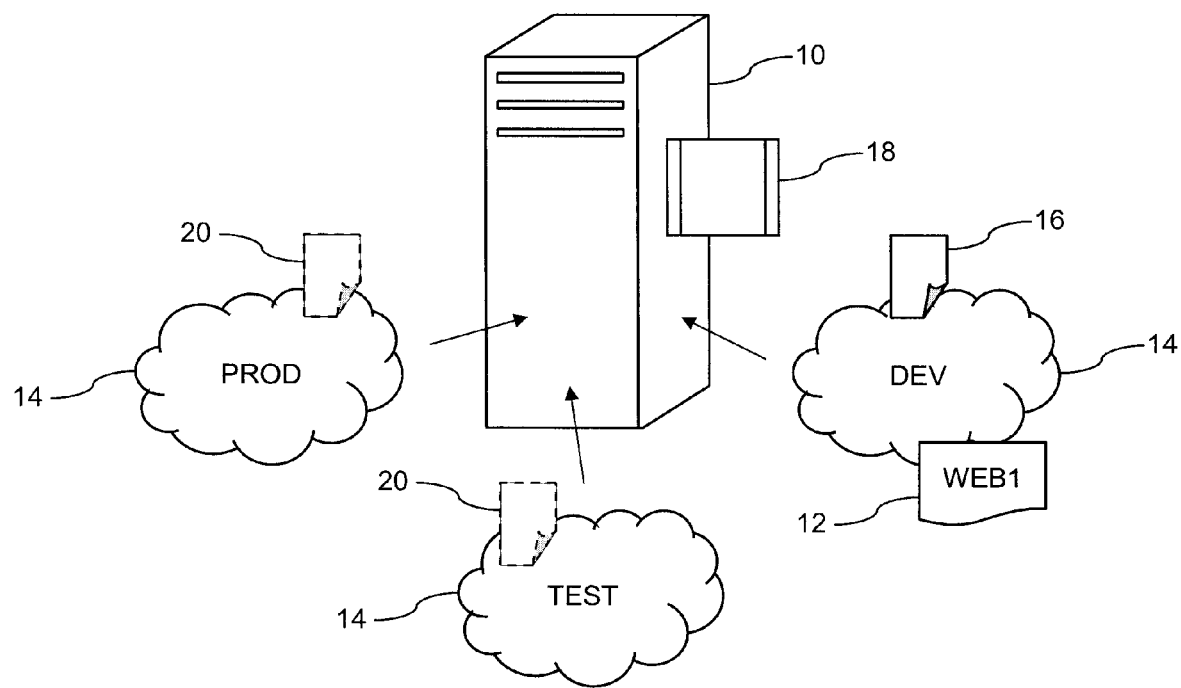

The web service registry 10 can be implemented using a technology such as WebSphere Service Registry and Repository (WSRR). The web service registry 10 may be operated using a modifier plug-in within WSRR. The plug-in is configured to be invoked when objects are created within WSRR and is able to detect when the object being created is an endpoint WSDL document 16. FIG. 2 shows the use of a plug-in 18, which is used to create additional documents 20 in the other environments 14 that are present in the registry 10. This automated process reduces the workload on an administrator and reduces the likelihood of mistakes being made in the creation of the additional documents 20.

When the plug-in 18 detects that an endpoint WSDL document 16 is being created it performs the following processing. The plug-in 18 queries the registry 10 to retrieve the set of environments 14 that are defined within the product 10. For each environment 14, then creates a copy of the endpoint WSDL document content, renames the port in the copy of the WSDL document to append an environment specific suffix, retrieves an endpoint URL template for the environment from the registry 10, rewrites the endpoint URL in the copy of the WSDL document using the information in the template and stores the new endpoint WSDL document in the registry, appending an environment specific suffix to the document name. In this way, when a new web service 12 is first loaded into the web service registry 10 it will be located in the first environment 14 (the "DEV" development environment 14). At the same time, the endpoint definition document 16 will be created manually by the author of the new web service 12. Once this document 16 is loaded into the registry 10, then this action is detected by the plug-in 18 which will automatically populate the additional documents 20 into the other environments 14. These additional documents 20 are stored in the registry 10 and 5 essentially prepare the way for the web service 10 once it is moved to a new environment 14.

There are several different ways in which the templates for the endpoint URLs could be defined for each environment 14. An embodiment of an approach that could be used would be to define the templates in a properties file and package this file in the same JAR file that contains the modifier plug-in 18. However, if it should be needed to define a new environment 14 in the registry 10 at some point in the future, then an administrator would need to modify the properties file and redeploy the updated plug-in JAR file 18 to the web services registry 10. This may create unnecessary complexity and increases the possibility of errors creeping in in some embodiments.

Figure 3:
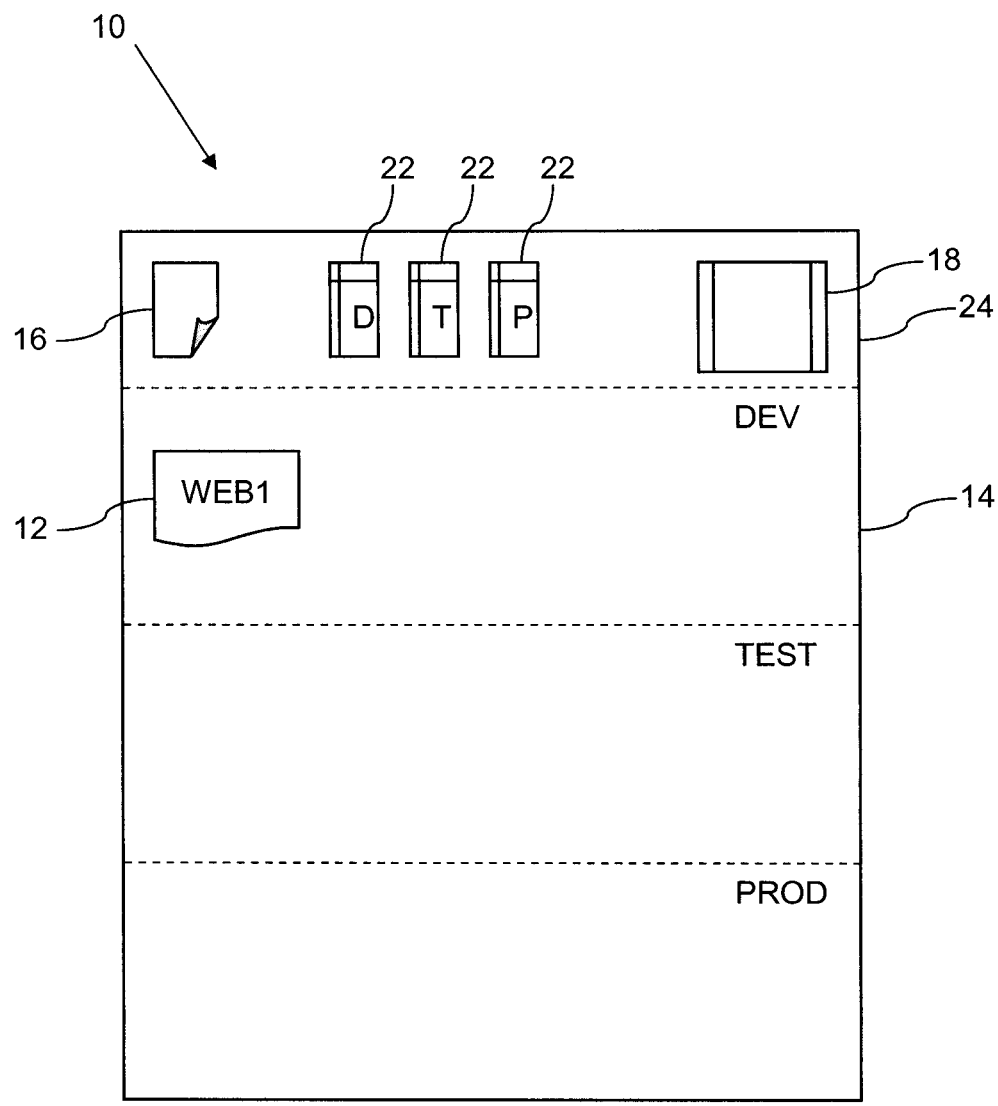
FIG. 3 is a schematic diagram of the internal storage of the web service registry.

Another embodiment of an approach would be to make use of ManualSOAPEndpoint objects within WSRR, if this is the technology being used. An instance of a ManualSOAPEndpoint object can be created to represent each environment defined within WSRR and classified with the appropriate environment classification. The SOAP location property on each of the instances of the ManualSOAPEndpoint can be used to contain the actual template for the environment specific URL. This is illustrated in FIG. 3. The web services registry 10 is shown divided into different environments 14, with the plug-in 18 and the objects 22 each representing an environment 14. The plug-in 18 can query the objects 22 in turn, as and when they are needed.

The web service 12 is residing in the development environment 14 and the other various components within the web service registry 10 are shown as being located in an administration zone 24. It is not consequential where these other components are located, as long as they are accessible within the registry 10. The endpoint definition document 16 is for the web service 12 and the creation of this document triggers the plug-in 18 to begin the process of creating the additional documents 20 for the other environments 14. The plug-in 18 uses the original document 16 as the basis for creating the additional documents 20 and queries the objects 22 to access the relevant environment specific data.

Figure 4:
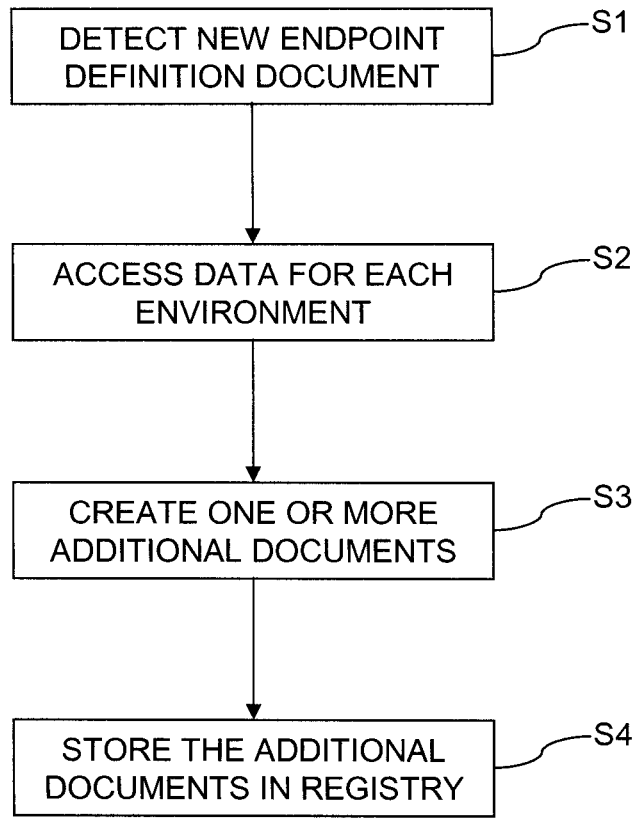
FIG. 4 is a flowchart of a method for operating the web service registry.

The method for operating the web service registry 10 for the web services 12 is summarised in FIG. 4. The web service registry 10 comprises a plurality of different environments 14 for the web services 12 and the method comprises the blocks of, firstly at block SI, detecting the creation of a first endpoint definition document 16 for a specific web service 12, the first endpoint definition document 16 defining address data for the specific web service 12 in one environment 14. The plug-in 18 in the preferred embodiment is the component that will detect the presence of a new endpoint definition document 16 for a new web service 12.

The next block in the method comprises block S2, accessing data 22 defining the different 10 environments 14 within the service registry 10. In some embodiments, the objects 22 each define a respective environment 14, which are accessed by the plug-in 18. As mentioned above, there is no reason that this data cannot be located in a single file or object, or even stored within the plug-in 18. The location and format of the data that is accessed is implementation-dependent and does not materially change the process in relation to the 15 handling of the new endpoint definition document 16. By using individual objects 22 it is easier to reuse objects 22 in other service registries 10 and also it is easier to create new objects 22, should a new environment 14 be created in the future.

The final two blocks of the method comprise, at block S3, creating one or more additional 20 endpoint definition documents 20 for the specific web service 10 from the first endpoint definition document 16 and the accessed data 22, and at block S4, storing each additional endpoint definition document 20 in the service registry 10. The creation of the additional endpoint definition documents 16 can be assisted using templates, as discussed above, or can simply be under the control of an algorithm executed by the plug-in 18, which will change the content of the existing endpoint definition document 16 using the data from the objects 22 and save the new endpoint definition document 20 using a new filename.

Figure 5:
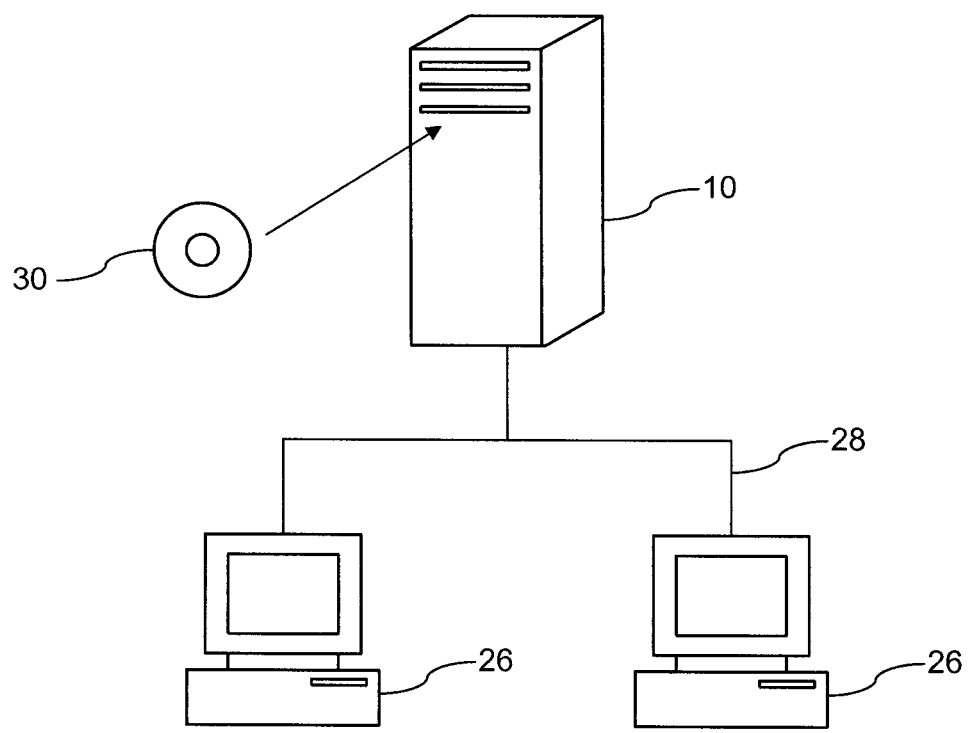
FIG. 5 is a schematic diagram of a computer system including the web services registry.

FIG. 5 shows a computer system which includes the web services registry 10 and client terminals 26 that can connect to the web services registry 10 over a network 28. The computing arrangement shown in FIG. 5 is a conventional client-server computing system that allows users of the client devices 26 to access services provided by the web service registry 10. This arrangement may be internal to one organisation, with a local network providing the access, or the arrangement of FIG. 5 could be open so that anybody with a suitable client device can connect to the web services registry 10 via a wide area network such as the Internet.

The web services registry 10 runs software that manages the access to the registry 10 and the web services 12 that are provided by the registry 10. This software can be considered to be located in the administration zone 24 of FIG. 3, for example. The plug-in 18 effectively connects to this software. A computer program product on a computer readable medium such as a compact disc read only memory (CD-ROM) 30 can provide part or all of the software being operated by the web services registry 10. The program product comprises instructions that are used to control at least the 10 plug-in 18. These instructions define the operation of the plug-in 18 in relation to the detection of a new web service 12.

The plug-in can be implemented in WSRR as described in detail below. WSRR defines a number of System Programming Interfaces (SPIs) that allow a hook into the standard processing that is performed by WSRR. Classes written to these interfaces are referred to as WSRR plug-ins. Plug-ins enable the implementation of code that enforces the governance processes that are defined by the business design within a SOA environment. There are currently three types of plug-in defined within WSRR, as follows:

1. Validators—Validation plug-ins are invoked at the beginning of calls to the WSRR API methods. They provide an opportunity to validate that the operation being performed on the objects within WSRR complies with the policies that are defined within the SOA environment. Returning an error from a validator plug-in will prevent the operation from being executed.

2. Modifiers—Modification plug-ins are invoked after any database updates associated with the WSRR API methods have taken place, but before the associated transaction has been committed. They provide an opportunity to modify the objects that are the target of the relevant operations and also to create new objects within WSRR. Returning an error from a modifier plug-in will force the associated transaction to rollback.

3. Notifiers—Notification plug-ins are invoked at the end of calls to the WSRR API methods. They provide an opportunity to perform various post processing tasks based on the result of the operation that was requested. A notifier plug-in cannot force the associated transaction to rollback. As mentioned above, the purpose of a modifier plug-in is to modify something during the processing of the WSRR operation that triggered the plug-in. For example, it can be used to modify one or more of the objects that have already been affected by a WSRR operation in order to add some additional metadata. Another example of how to use a modifier is to create some new objects in WSRR and relate them in some way to the objects that have already been affected by the WSRR operation. This can be used to detect that an endpoint WSDL document has been loaded into WSRR and then used to copy this WSDL document a number of times. For each copy of the endpoint WSDL document that is created, the location attribute is rewritten on the soap:address element so that it is specific to a given environment.

Figure 6:
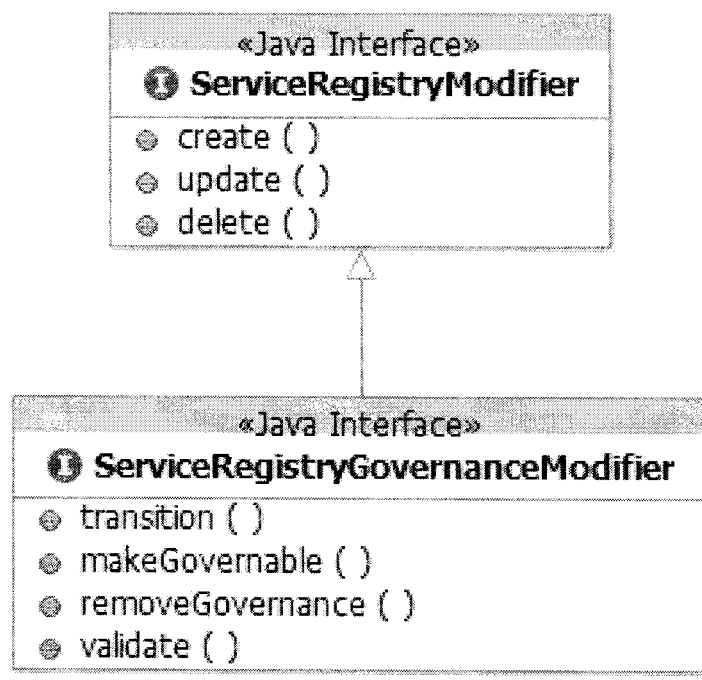
FIG. 6 shows example modifier interfaces that are defined by the WSRR application programming interface (API).

The modifier interfaces defined by the WSRR API are shown in FIG. 6. The methods that are defined by the ServiceRegistryGovernanceModifier interface are only invoked for objects that are currently part of a governed lifecycle. That is, they will only be invoked on a governance modifier as a result of invoking a WSRR Governance API method on a governed object.

There are two modifier interfaces defined by the API. The ServiceRegistryModifier interface defines the methods that should be implemented if it is needed to modify objects in WSRR as a result of invoking operations on the WSRR Core API, such as create, update or delete. The ServiceRegistryGovernanceModifier interface extends the ServiceRegistryModifier interface and defines additional methods that should be implemented if it is needed to modify objects in WSRR as a result of performing governance operations in WSRR.

A modifier plug-in is implemented that will be invoked when WSDLDocument objects are created in WSRR. Therefore, the modifier plug-in only needs to implement the ServiceRegistryModifier interface. For this reason, describing the ServiceRegistryGovernanceModifier interface is not required.

The create method ServiceRegistryStatus create(OriginalObject newObject) is invoked when an instance of an OriginalObject is created in WSRR but before the associated transaction has been committed. The create method is passed a reference to the OriginalObject that was created. The modifier is able to modify this object to ensure that it complies with the relevant governance policies that are in place before it returns from the create method. It is also able to create new objects in WSRR in response to the object being created.

The create method must return a ServiceRegistryStatus object to indicate whether the modification process succeeded or failed. If the create method returns a SUCCESS or WARNING return code in the ServiceRegistryStatus object, WSRR will continue with the create operation and commit the transaction. If the create method returns an ERROR return code in the ServiceRegistryStatus object, WSRR will throw a ServiceRegistryModificationException from the invoked WSRR API method and will roll the transaction back, meaning that neither the create operation, nor any operations performed by the plug-in, will take effect.

The update method ServiceRegistryStatus update (BaseObject oldObject, BaseObject newObject) is invoked when an existing OriginalObject within WSRR is updated but before the associated transaction has been committed. The update method is passed references to the object in its current state (oldObject) and its new state (newObject) in order to perform the required modification tasks. The modifier is able to modify the new state (newObject) of the object to ensure that it complies with the relevant governance policies that are in place before it returns from the update method. In the case of Document objects, the required new object state provided by the newObject parameter might have no content present. This can occur if there is retrieved only the metadata for the document and it is desired to update only that metadata. If there is no content present, the getContent( ) method will return null. Because, in this case, there is no content on the new document state, it can be assumed that any previous document content has not been changed. If the modifier is needed to access the document content, the value from the current object state provided by the oldObject parameter can be safely used.

The update method must return a ServiceRegistryStatus object to indicate whether the modification process succeeded or failed. If the update method returns a SUCCESS or WARNING return code in the ServiceRegistryStatus object, WSRR will continue with the update operation and commit the transaction, and both the update, and any operations performed by the modifier, will take effect. If the update method returns an ERROR return code in the ServiceRegistryStatus object, WSRR will throw ServiceRegistryModificationException from the invoked WSRR API method and will roll the transaction back, meaning that neither the update operation, nor any operations performed by the plug-in, will take effect.

The delete method ServiceRegistryStatus delete(OriginalObject oldObject) is invoked when an existing OriginalObject within WSRR is deleted but before the associated transaction has been committed. The delete method is passed a reference to the object that is being deleted. Obviously, there is no point in the plug-in performing any modifications to the object that is being deleted, but it is able to modify other objects in WSRR in response to the delete taking place.

The delete method must return a ServiceRegistryStatus object to indicate whether the modification process succeeded or failed. If the delete method returns a SUCCESS or WARNING return code in the ServiceRegistryStatus object, WSRR will continue with the delete operation and commit the transaction, and both the delete, and any operations performed by the modifier, will take effect. If the delete method returns an ERROR return code in the ServiceRegistryStatus object, WSRR will throw a ServiceRegistryModificationException from the invoked WSRR API method and WSRR will roll back the transaction, meaning that neither the delete operation, nor any operations performed by the plug-in, will take effect.

In the SOA environment, the developers always generate endpoint WSDL documents that contain the actual production endpoint for the service. When one of these endpoint WSDL 20 documents is loaded into WSRR, the modifier plug-in needs to apply the appropriate Environment classification to mark it as the Production endpoint WSDL document. It then needs to iterate over all of the other immediate subclasses of the Environment classification that have been defined within WSRR and create a copy of the endpoint WSDL for each environment. For each copy it needs to:

1. Rename the port in the endpoint WSDL document to include an environment specific suffix, for example, Development or Staging. This will enable the unique identification of the port that is specific to each environment.
2. Rewrite the endpoint URL using an environment specific template of some form.
3. Classify the new endpoint WSDL document with the appropriate environment classification.
4. Locate the SOAPServiceEndpoint correlated object that is created when the new endpoint WSDL document is loaded and classify it with the appropriate environment classification.

There are several ways to define the template for the endpoint URL. One approach would be to define them in a properties file and package this file in the same JAR file that contains the modifier plug-in. The problem with this approach, however, is that if it is needed to define a new environment in WSRR at some point in the future, the properties file would need to be modified and the updated plug-in JAR would need to be redeployed to WSRR.

A more flexible approach would be to make use of ManualSOAPEndpoint objects within WSRR. It is possible to manually create one of these objects to represent each environment defined within a SOA and classify each one with the appropriate Environment classification. The SOAP Location property can be used to contain the actual template for the URL.

As mentioned previously, it is required to provide an EndpointWSDLCopyModifier class that implements the ServiceRegistryModifier interface. Since this modifier only needs to be invoked when objects are created in WSRR, this class only needs to define stub implementations of the update and delete methods. The implementation should also make use of the WSRR delegate objects that are provided with the product. The WSRR delegate objects are used to simplify the process of accessing WSRR. They are business delegates that provide a wrapper around the WSRR local EJB interfaces and they hide the details of using the EJB API from the client. Because these delegates access the WSRR EJB API using the local interfaces they can only be used from within plug-in code.

The implementation should also make use of the BSRSDOHelper object that is provided with the product. This object is used to simplify the process of modifying in-memory representations of WSRR objects, performing such tasks as adding relationships and retrieving property values.

Create Method Pseudo Code: the pseudo code in Table 1 below describes the creation method for the plug-in. This method will be invoked when any OriginalObjects are created within WSRR. The first check that is performed, therefore, is to see whether the object being created is a WSDLDocument object. If it is not a WSDLDocument object then this plug-in is not interested in it and allows WSRR to continue processing. Various important checks are also performed to see if the WSDL document that is being created is an endpoint WSDL document and to check to see if the WSDL document that is being created has already been classified with Environment classification. This latter check is important because the EndpointWSDLCopyModifier plug-in will be creating WSDL documents itself. Since the plug-in will be classifying these objects with an Environment classification, this check allows the system to detect when the plug-in is invoked as a result of creating objects itself, thus avoiding an infinite loop.

Once the plug-in has determined that it is interested in the WSDL document that is being created, the next block of code performs specific processing on this object. As mentioned previously, it is assumed that the endpoint WSDL document that is being created is for the production environment in the SOA, so the code classifies the object with the appropriate Environment classification. It also locates the SOAPServiceEndpoint and classifies it in the same.

The for loop iterates over the Environment classifications that have been defined in WSRR, excluding the Production environment classification, and creates a copy of the production endpoint WSDL document. During the copy process, it rewrites the location attribute of the wsdlsoap:address element based on the template for the environment defined in the ManualSOAPEndpoint object. It then loads the new environment specific endpoint WSDL document into WSRR, relating it to the WSDL binding document that already exists in WSRR. Finally, it locates the SOAPServiceEndpoint object that is created as a result of loading the new endpoint WSDL document and classifies it in the same way.

TABLE 1

Example Create Method Pseudo Code

```
if the object is a WSDL document
    if the object is an endpoint WSDL document
        if the object does not have an environment classification
            Classify object with the "Production" classification
            Retrieve SOAP Service Endpoint object for the document
            Classify SOAP Service Endpoint object with "Production"
            classification
            Retrieve all of the environment classifications for each
            environment classification
                if environment classification is not "Production"
                    Make a copy of the endpoint WSDL document for
                    the current environment
                    Associate the WSDL binding with the new
                    endpoint WSDL document
                    Create the new endpoint WSDL document in
                    WSRR
                    Retrieve SOAP Service Endpoint object for the
                    new endpoint WSDL document
                    Classify SOAP Service Endpoint object with
                    current environment classification
                endif
            end for
        endif
    endif
endif
return success
```

The isEndpointWSDL method pseudo code in Table 2 describes the blocks that need to be performed in order to determine if a WSDL document is an endpoint WSDL document. An endpoint WSDL document is defined as a WSDL document that contains a service element but does not contain either a portType element or a binding element.

TABLE 2

Example isEndpointWSDL Method Pseudo Code

```
Set result to false
Get the content of the WSDL document
if the document does not contain a portType element
    if the document does not contain a binding element
        if the document contains a service element
            Set result to true
        endif
    endif
endif
Return result
```

The hasEnvironmentClassification Method pseudo code in Table 3 describes the blocks that need to be performed in order to determine if a WSDL document in WSRR has been classified with an Environment classification. It iterates over the classifications on the object and checks each one to see if it is a subclass of the Environment classification.

TABLE 3

Example hasEnvironmentClassification Method Pseudo Code

```
Set result to false
Get the list of classifications for the object
for each classification
    if the classification is a subclass of the "Environment" classification
        Set result to true
        Exit the for loop
    Endif
end for
return result
```

The createEndpointWSDLDocumentObject Method pseudo code in Table 4 describes the blocks that need to be performed in order to make an environment specific copy of an existing endpoint WSDL document. The content of the production endpoint WSDL document is copied and then the location attribute of the wsdlsoap:address element is modified based on the template definition for the target environment. The new WSDL document is then created in WSRR with a name that has the target environment appended. The new WSDL document is also classified with the target environment classification.

TABLE 4

Example createEndpointWSDLDocumentObject Method Pseudo Code

```
Copy the content of the existing WSDL document
Get the wsdlsoap:address element from the copied content
Get the location attribute from the wsdlsoap:address element
Retrieve the URL template for the target environment
Create a new URL based on the existing URL and the template
Set the location attribute to the new URL
Create a new WSDL document object in WSRR with the modified content
Append an environment specific suffix to the name of the new WSDL
document
Classify the new WSDL document with the relevant environment
classification.
```

In order to use the modifier plug-in, it is necessary to compile the source code, package the generated class file into a JAR file and load the JAR file into WSRR.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, blocks, operations, elements, and/or components, but do not preclude the presence or addition of one more other features, integers, blocks, operations, element components, and/or groups thereof.

The corresponding structures, materials, acts, and equivalents of all means or block plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the blocks (or operations) described therein without departing from the spirit of the invention. For instance, the blocks may be performed in a differing order or blocks may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for operating a service registry for web services, the service registry comprising a plurality of different environments for the web services, the method comprising:
    detecting the creation of a first endpoint definition document for a specific web service, the first endpoint definition document defining address data for the specific web service in one environment, wherein the first endpoint definition document was created manually by an author of the web service; and
    based on the detecting of the creation of the first endpoint definition document for the specific web service, automatically performing:
    querying the service registry to determine all environments that are defined in the service registry;
    determining the plurality of different environments based on the determination of all environments that are defined in the service registry, wherein the plurality of different environments comprise any environment for which no endpoint definition document for the specific web service exists in the service registry;
    accessing data defining each of the plurality of different environments associated with the service registry;
    creating endpoint definition document for each of the plurality of different environments for the specific web service from the first endpoint definition document and the accessed data; and
    storing the created respective endpoint definition document for each of the plurality of different environments using the service registry.

2. The method according to claim 1, wherein the creating one or more additional endpoint definition documents for the specific web service comprises copying the first endpoint definition document and adjusting address data associated with the first endpoint definition document according to the accessed data.

3. The method according to claim 1, wherein the creating one or more additional endpoint definition documents for the specific web service comprises accessing a template for each environment and modifying the first endpoint definition document according to an accessed template.

4. The method according to claim 1, wherein the storing one or more additional endpoint definition documents in the service registry comprises storing the one or more additional endpoint definition documents with an environment specific suffix.

5. A system for a service registry for web services, the service registry comprising a plurality of different environments for the web services, the service registry configured to:
    detect the creation of a first endpoint definition document for a specific web service, the first endpoint definition document defining address data for the specific web service in one environment, wherein the first endpoint definition document was created manually by an author of the web service; and based on the detecting of the creation of the first endpoint definition document for the specific web service, automatically perform:

query the service registry to determine all environments that are defined in the service registry;

determine the plurality of different environments based on the determination of all environments that are defined in the service registry, wherein the plurality of different environments comprise any environment for which no endpoint definition document for the specific web service exists in the service registry;

access data defining each of the plurality of different environments associated with the service registry;

create endpoint definition document for each of the plurality of different environments for the specific web service from the first endpoint definition document and the accessed data; and store the created respective endpoint definition document for each of the plurality of different environments using the service registry.

6. The system according to claim 5, wherein the service registry is configured to create the one or more additional endpoint definition documents for the specific web service by copying the first endpoint definition document and adjust address data associated with the first endpoint definition document according to the accessed data.

7. A system according to claim 5, wherein the service registry is configured to create the one or more additional endpoint definition documents for the specific web service by accessing a template for each environment and modify the first endpoint definition document according to an accessed template.

8. A system according claim 5, wherein service registry is configured to store the one or more additional endpoint definition documents in the service registry by storing the one or more additional endpoint definition documents with an environment specific suffix.

9. A computer program product for operating a service registry for web services, the service registry comprising a plurality of different environments for the web services, the computer program product comprising:

a tangible, non-transitory storage medium readable by a processing circuit and storing instructions for execution by the processing circuit for performing a method comprising:

detecting the creation of a first endpoint definition document for a specific web service, the first endpoint definition document defining address data for the specific web service in one environment, wherein the first endpoint definition document was created manually by an author of the web service; and based on the detecting of the creation of the first endpoint definition document for the specific web service, automatically performing:

querying the service registry to determine all environments that are defined in the service registry;

determining the plurality of different environments based on the determination of all environments that are defined in the service registry, wherein the plurality of different environments comprise any environment for which no endpoint definition document for the specific web service exists in the service registry;

accessing data defining each of the plurality of different environments associated with the service registry;

creating endpoint definition document for each of the plurality of different environments for the specific web service from the first endpoint definition document and the accessed data; and storing the created respective endpoint definition document for each of the plurality of different environments using the service registry.

10. A computer program product according to claim 9, wherein the creating one or more additional endpoint definition documents for the specific web service comprises copying the first endpoint definition document and adjusting address data associated with the first endpoint definition document according to the accessed data.

11. A computer program product according to claim 9, wherein the creating one or more additional endpoint definition documents for the specific web service comprises accessing a template for each environment and modifying the first endpoint definition document according to an accessed template.

12. A computer program product according to claim 9, wherein the storing the one or more additional endpoint definition documents in the service registry comprises storing the one or more additional endpoint definition documents with an environment specific suffix.

* * * * *